US006456194B1

(12) United States Patent
Carlson et al.

(10) Patent No.: US 6,456,194 B1
(45) Date of Patent: Sep. 24, 2002

(54) DEVICE AND METHOD FOR SENSING AND INDICATING INCLINATION OF AN AUTOMOTIVE VEHICLE

(75) Inventors: Craig D. Carlson, 770 Boylston St., Boston, MA (US) 02199; Michael A. Reed, Danvers, MA (US); J. Thomas Fowler, Marblehead, MA (US)

(73) Assignee: Craig D. Carlson, Framingham, MA (US)

( * ) Notice: Subject to any disclaimer, the term of this patent is extended or adjusted under 35 U.S.C. 154(b) by 0 days.

(21) Appl. No.: 09/666,191

(22) Filed: Sep. 21, 2000

(51) Int. Cl.$^7$ .............................................. B60Q 1/00

(52) U.S. Cl. ..................... 340/440; 340/691.6

(58) Field of Search ................. 340/440, 439, 340/438, 691.6, 691.5, 691.4, 815.4

(56) References Cited

U.S. PATENT DOCUMENTS

| | | | |
|---|---|---|---|
| 3,863,067 A | | 1/1975 | Gooley ................. 33/366.16 |
| 3,921,128 A | * | 11/1975 | Snead ........................ 340/440 |
| 4,503,622 A | | 3/1985 | Swartz et al. ............ 33/366.14 |
| 4,606,133 A | | 8/1986 | Mills ....................... 33/366.14 |
| 4,630,904 A | * | 12/1986 | Pastore ...................... 359/636 |
| 4,725,843 A | * | 2/1988 | Suzuki et al. ............... 342/359 |
| 4,853,675 A | | 8/1989 | Foster |
| 4,882,565 A | * | 11/1989 | Gallmeyer .................. 340/461 |
| 4,908,767 A | | 3/1990 | Scholl et al. |
| 4,912,662 A | | 3/1990 | Butler et al. ................ 702/154 |
| 4,926,690 A | | 5/1990 | Oberg ..................... 73/514.37 |
| 4,942,668 A | | 7/1990 | Franklin .................. 33/366.14 |
| 5,066,112 A | | 11/1991 | Lynam et al. .............. 359/267 |
| 5,073,012 A | | 12/1991 | Lynam ...................... 359/265 |
| 5,207,492 A | * | 5/1993 | Roberts ....................... 362/30 |
| 5,223,814 A | * | 6/1993 | Suman ................... 340/461 X |
| 5,255,442 A | | 10/1993 | Schierbeek et al. .......... 33/361 |
| 5,285,060 A | * | 2/1994 | Larson et al. .......... 340/461 X |
| 5,371,951 A | | 12/1994 | Piske ...................... 33/366.12 |
| 5,406,858 A | * | 4/1995 | Brainard .................... 74/5.34 |

(List continued on next page.)

FOREIGN PATENT DOCUMENTS

| | | |
|---|---|---|
| EP | 0 965 502 | 12/1999 |
| FR | 2 783 778 | 3/2000 |
| JP | 240399 | * 9/1997 |

OTHER PUBLICATIONS

Analog Devices, Analog Devices' Micromachined Accelerometers to be Used in Ford Vehicles, Copyright 1995–1999 Analog Devices, Inc., Apr. 21, 1999, http://www.content.analog.com/pressrelease/prdisplay/0,1622,35,00.html, pp. 1–2.

Analog Devices, Analog Devices Accelerometer Named EDN "Innovation of the Year", Copyright 1995–1999 May 3, 1999, http://www.content.analog.com/pressrelease/prdisplay/0,1622,43,00.html, pp. 1–2.

Analog Devices, ADXL202, Copyright 1995–1999, pp. 1–3, http://www.analog.com/industry/iMEMS/products/ADXL202.html, Jul. 23, 1999.

Analog Devices, Previous Accelerometers eNewsletter, Copyright 1995–1999, Jul. 23, 1999, p. 1. http://www.analog.com/industry/iMEMS/prevenews.html.

(List continued on next page.)

Primary Examiner—Thomas Mullen
(74) Attorney, Agent, or Firm—Wolf, Greenfield & Sacks, P.C.

(57) ABSTRACT

A device and method used to indicate vehicle inclination and conditions indicative of a potential rollover is disclosed. The device and method may be embodied in original equipment or in an aftermarket product in a manner so that the driver may easily determine the vehicle inclination. For example, the device and method may be embodied in a mirror assembly mounted in the vehicle. The device and method may also be used to detect the rate of change of inclination to provide a warning of adverse driving conditions. The device and method may also include a compass that indicates a corrected heading of the vehicle.

64 Claims, 7 Drawing Sheets

U.S. PATENT DOCUMENTS

| | | | |
|---|---|---|---|
| 5,459,676 A | 10/1995 | Livingston | 700/296 |
| 5,631,638 A * | 5/1997 | Kaspar et al. | 340/438 X |
| 5,632,092 A | 5/1997 | Blank et al. | 33/361 |
| 5,644,851 A | 7/1997 | Blank et al. | 33/361 |
| 5,825,284 A | 10/1998 | Dunwoody et al. | 340/440 |
| 5,890,084 A * | 3/1999 | Halasz et al. | 701/45 |
| 5,925,084 A | 7/1999 | Gotoh et al. | |
| 5,956,260 A | 9/1999 | Heger et al. | |
| 6,038,495 A | 3/2000 | Schiffmann | |
| 6,081,188 A | 6/2000 | Kutlucinar et al. | |
| 6,092,005 A | 7/2000 | Okada | |
| 6,104,284 A * | 8/2000 | Otsuka | 340/440 |
| 6,111,684 A | 8/2000 | Forgette et al. | |
| 6,130,608 A | 10/2000 | McKeown et al. | |
| 6,179,394 B1 * | 1/2001 | Browalski et al. | 701/38 X |
| 6,192,305 B1 * | 2/2001 | Schiffmann | 701/45 |
| 6,262,831 B1 * | 7/2001 | Bauer et al. | 359/265 |
| 6,263,261 B1 * | 7/2001 | Brown et al. | 701/1 |
| 2001/0039475 A1 * | 11/2001 | McCarthy et al. | 701/213 |

OTHER PUBLICATIONS

Analog Devices, The Accelerometers eNewsletter, Copyright 1995–1999, pp. 1–2, http://www.analog.com/industry/iMEMS/prevenews.html, Mar. 27, 2000.

Analog Devices, Low Cost ±2 g/±10 gDual Axis iMEMS® Accelerometers with Digital Output, Copyright Analog Devices, Inc. 1999 Rev. B, pp. 1–11.

* cited by examiner

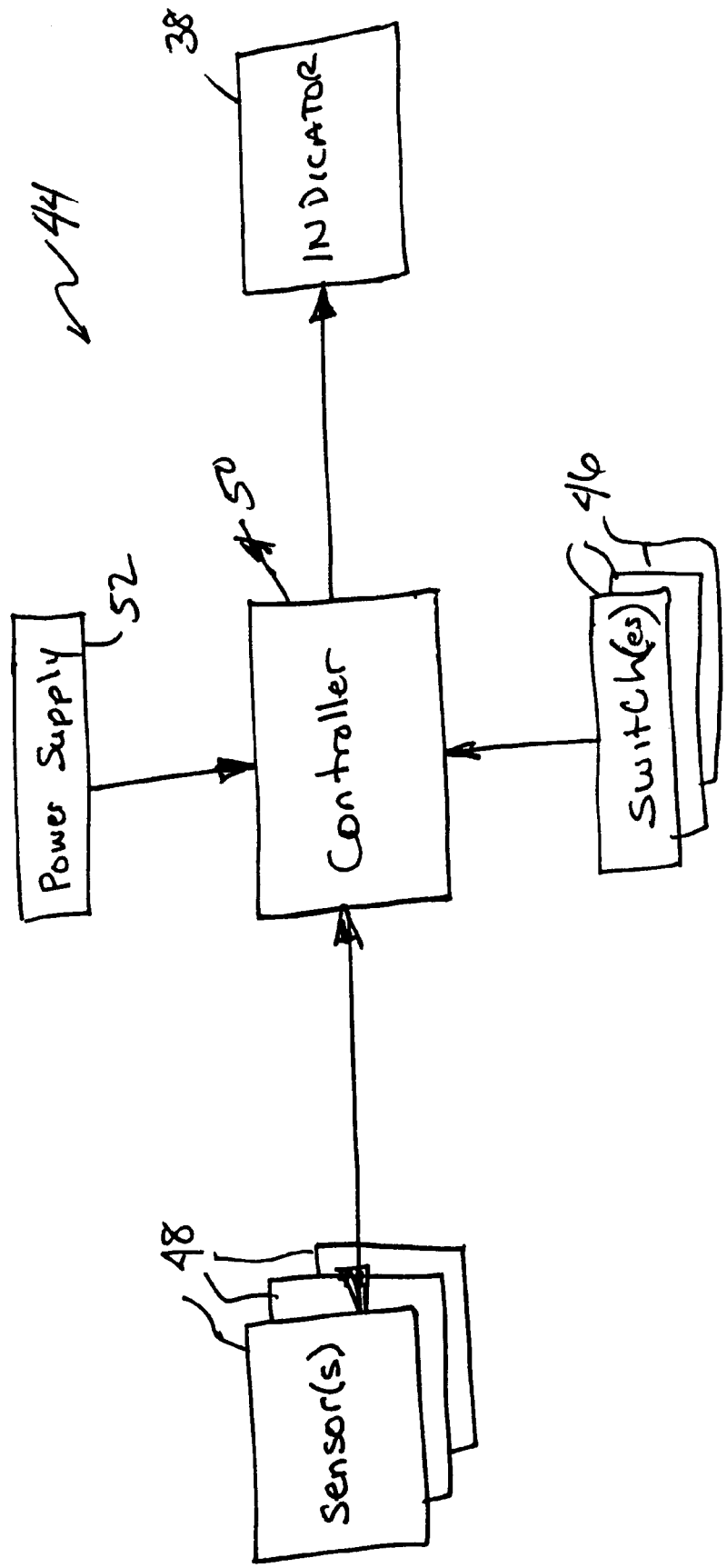

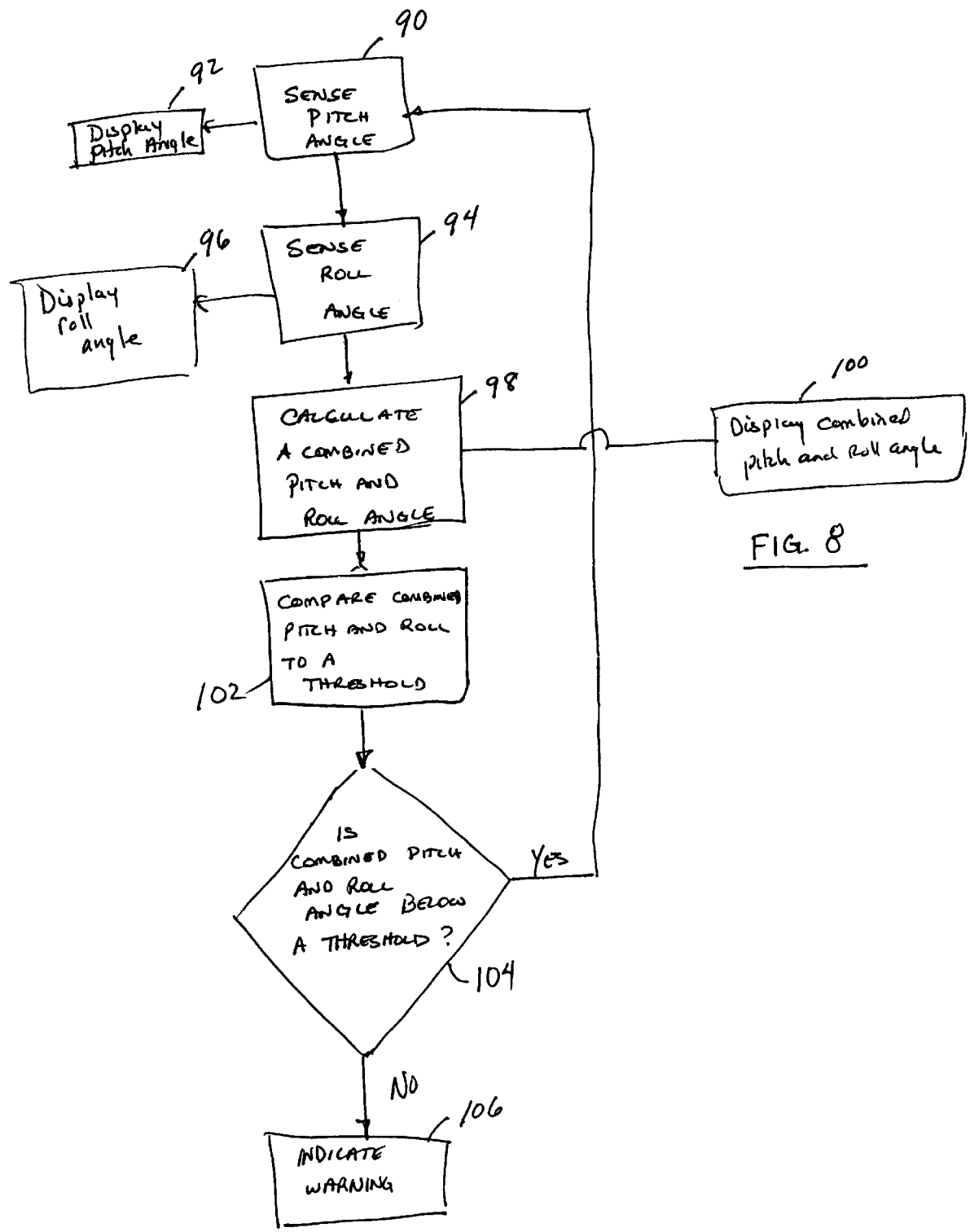

DEVICE AND METHOD FOR SENSING AND INDICATING INCLINATION OF AN AUTOMOTIVE VEHICLE

BACKGROUND OF THE INVENTION

1. Field

The present invention relates to automotive vehicle instrumentation and, more particularly, to instrumentation for sensing and indicating inclination of the vehicle.

2. Related Art

Some automotive vehicles may have a propensity to rollover under certain adverse driving conditions, such as when in an aggressive turn or on a steep incline. This is primarily due to their high center of gravity. Automotive engineers have been challenged by consumer demands to produce vehicles having a high center of gravity (such as sport utility vehicles) while reducing or eliminating the propensity of these vehicles to rollover.

At the same time, drivers of these vehicles tend to acclimate to the vehicle's behavior under various driving conditions, thereby decreasing the potential for driver-induced rollovers. However, this may not always be the case. For example, in multi-vehicle households, wherein one vehicle is a sport utility vehicle and the other is either a sports car or a sedan, the driver may not be immediately conditioned to the degree of responsiveness of each vehicle. In this respect, sports cars typically have exceptional handling around sharp curves, due to their low center of gravity; whereas, sport utility vehicles do not. As a result, driving style enjoyed in the sports car may have adverse effects if used in the sport utility vehicle.

Therefore, systems have been developed to provide information to the driver about a vehicle's inclination. One example of such a system is described in U.S. Pat. No. 5,825,284. This system includes multiple sensors mounted at multiple structural locations on the vehicle, resulting in a relatively complex detection and indication system.

SUMMARY OF THE INVENTION

The present invention is a simple device and a method used to provide information about vehicle inclination and conditions that would indicate the potential of a rollover. The device and method may be embodied in original equipment or in an aftermarket product that allows the driver to readily and easily determine the vehicle's inclination. The device and method may also be used to warn of a possible rollover condition. The device and method may also utilize the inclination information to indicate a corrected heading of the vehicle.

In one embodiment of the invention, a mirror assembly for use in a vehicle is disclosed. The mirror assembly includes a frame, a mirror mounted to the frame and an indicator mounted to the frame. The indicator communicates directly or indirectly with a sensor that is responsive to at least one of pitch angle and roll angle of the vehicle. The indicator indicates the at least one of pitch angle and roll angle.

In another embodiment, a multiple use mirror assembly for use in a motor vehicle is disclosed. The mirror assembly includes a mirror frame having a mirror fixed thereto and means for adjustably securing the mirror frame to the motor vehicle. The mirror assembly also includes an indicator integrally secured to the mirror assembly and simultaneously visible with reflections in the mirror. At least one sensor for sensing at least one of pitch angle and roll angle of the motor vehicle independently of the relative position of the mirror frame and mirror relative to the vehicle is operatively connected to the indicator. The indicator indicates the sensed at least one of pitch angle and roll angle of the vehicle.

In another embodiment, an apparatus for detecting inclination of a vehicle is disclosed. The apparatus includes a controller and a sensor communicating with the controller. This sensor is responsive to at least one of pitch angle and roll angle of the vehicle. The controller calculates a rate of change of the at least one of pitch angle and roll angle based on the at least one of pitch angle and roll angle of the vehicle sensed by the sensor.

In yet another embodiment, a method of detecting inclination of a vehicle is disclosed. The method includes sensing at least one of pitch angle and roll angle of the vehicle, and calculating a rate of change of the at least one of pitch angle and roll angle.

In still another embodiment, a method of detecting inclination of a vehicle is disclosed. The method includes sensing at least one of pitch angle and roll angle of the vehicle, comparing the at least one of sensed pitch angle and roll angle to at least one threshold, and comparing the at least one of sensed pitch angle and roll angle to a different threshold based upon vehicle operating conditions.

In yet another embodiment, a method of reducing false alarms in a device for detecting inclination of a vehicle is disclosed. The method includes sensing at least one of pitch angle and roll angle of the vehicle, calculating a rate of change of the at least one pitch angle and roll angle of the vehicle, and warning only if the rate of change of the at least one of pitch angle and roll angle of the vehicle exceeds a first threshold value and does not exceed a second threshold value.

In another embodiment, a device in a vehicle is disclosed. The vehicle has a vehicle plane defined by the plane through which the rotational axes of the wheels of the vehicle pass. The device includes a sensor for sensing lateral acceleration of the vehicle in the vehicle plane. The device also includes a controller communicating with the sensor. The controller calculates a rate of change of the lateral acceleration and compares the calculated rate of change to a threshold. The device further includes an indicator communicating directly or indirectly with the controller. The indicator indicates a warning when the calculated rate of change exceeds the threshold.

In another embodiment, a method of detecting inclination of a vehicle is disclosed. The method includes sensing at least one of pitch angle and roll angle of the vehicle to provide a static signal; calculating a rate of change of the at least one of pitch angle and roll angle to provide a transient parameter; combining the static signal and the transient signal to provide a combined inclination parameter; and, comparing the combined inclination parameter to a threshold.

In another embodiment, a mirror assembly for use in a vehicle is disclosed. The mirror assembly includes a frame and a mirror mounted to the frame. A compass is coupled to the frame. The compass detects a heading of the vehicle. The compass communicates with a controller that communicates with a sensor that is responsive to at least one of pitch angle and roll angle of the vehicle. The controller corrects the detected heading of the vehicle based on the sensed at least one of pitch angle and roll angle of the vehicle. An indicator is mounted to the frame. The indicator indicates the corrected heading.

Various embodiments of the present invention provide certain advantages and overcome certain drawbacks of prior devices and systems. Embodiments of the invention may not share the same advantages and those that do may not share them under all circumstances.

Further features and advantages of the present invention as well as the structure and method of making various embodiments of the present invention are described in detail below with reference to the accompanying drawings.

BRIEF DESCRIPTION OF THE DRAWINGS

Various embodiments of the invention will now be described, by way of example, with reference to the accompanying drawings, in which.

DETAILED DESCRIPTION

According to one aspect of the invention, a device provides the driver with information about the inclination of the vehicle in an easily discernable manner. The inclination information is preferably displayed in the driver's normal field of view. In addition, the device may be supplied as original equipment in the vehicle or as an aftermarket item. To accommodate either of these goals, in one embodiment, an indicator for the device is embodied in a mirror assembly, such as a rearview mirror assembly.

Figure 1:
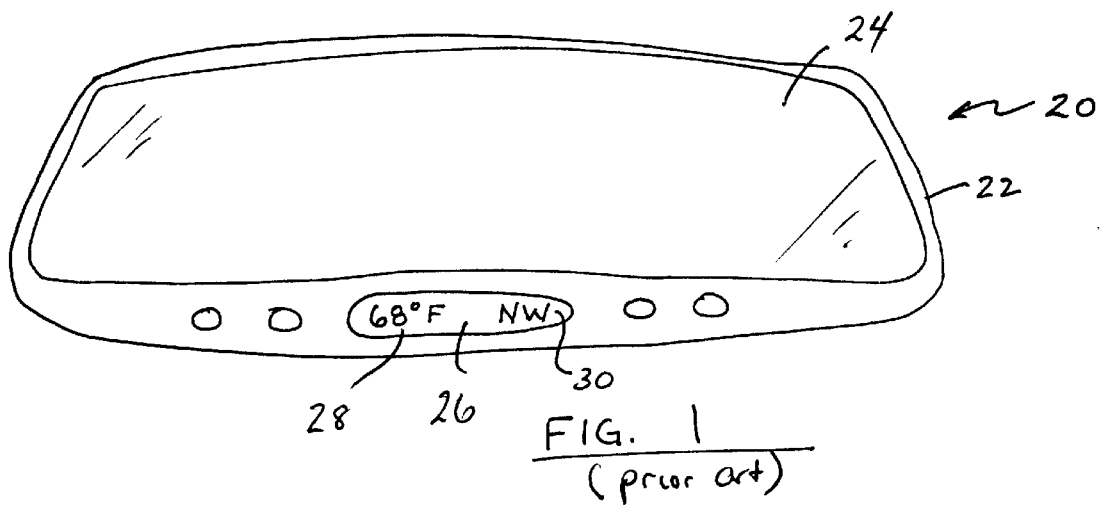
FIG. 1 is a prior art mirror assembly.

Prior mirror assemblies include various indications of desired parameters. As shown in FIG. 1, a prior art mirror assembly 20 includes a frame 22 and a mirror 24 mounted to the frame. The mirror assembly 20 further includes an indicator 26 for indicating the interior or exterior temperature 28 and the heading 30 of the vehicle.

In the embodiment described with reference to FIG. 2, a mirror assembly 32 includes a frame 34 and a mirror 36 mounted to the frame 34, as in the prior art mirror assembly. The mirror assembly 32 also includes an indicator 38 mounted to the frame 34. However, rather than displaying interior or exterior temperature and the heading of the vehicle, as in the prior art mirror assembly, additionally or alternatively, the indicator indicates the pitch angle 40 of the vehicle or the roll angle 42 of the vehicle or both the pitch and roll angles.

Figure 2:
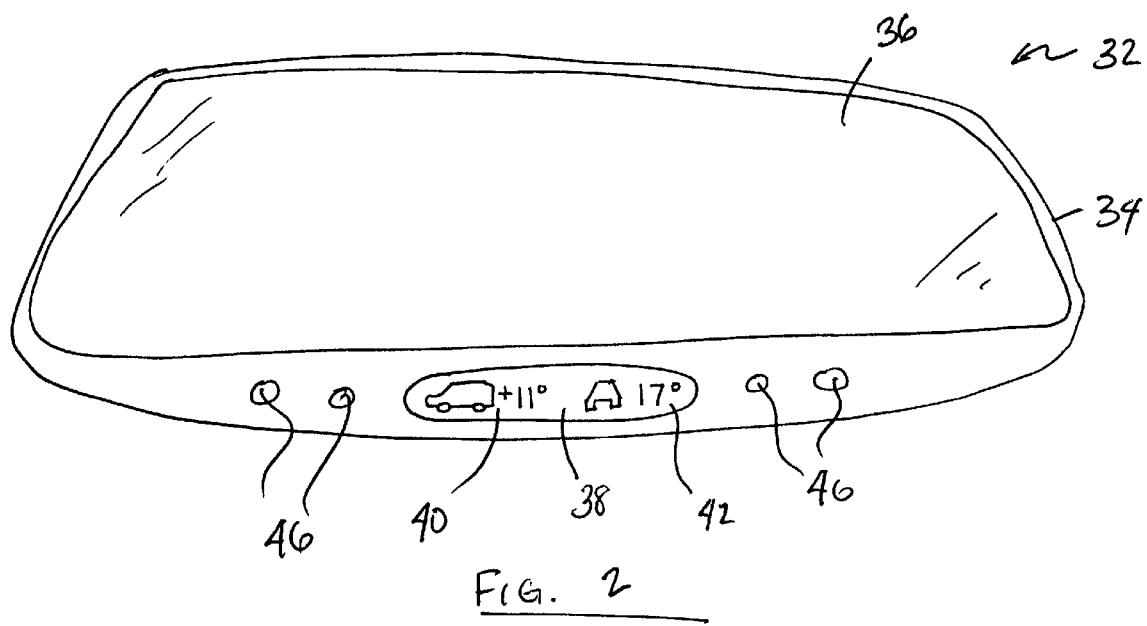
FIG. 2 is a mirror assembly according to one aspect of the present invention embodying a device for indicating vehicle inclination.

Although FIG. 2 shows the indicator as a visual display device, such as an LED display, the present invention is not limited in this respect as other suitable indicators may be employed. For example, the indicator may be an audible indicator that emits tones depending on the parameter to be indicated. Further, the indicator may be a horizon indicator that displays both pitch and roll.

In another illustrative embodiment, the mirror assembly 32 may also include a compass to indicate the heading and/or a thermometer to indicate the temperature together with the pitch angle 40 and/or the roll angle 42 of the vehicle. When such a mirror assembly 32 displays all such parameters, the default display may be the compass and thermometer. However, in one embodiment, the indicator 38 may be switched from indicating the temperature and/or heading to indicating the pitch angle and roll angle of the vehicle. The driver can manually change the display with the use of a switch(es) or the display may be changed automatically. Automatic switching may occur when a pitch angle or roll angle parameter exceeds a threshold, as will be more fully described below. It should be appreciated that the present invention is not limited in this respect and the all information (namely, heading, temperature, pitch angle and roll angle) may be simultaneously displayed.

Figure 3:
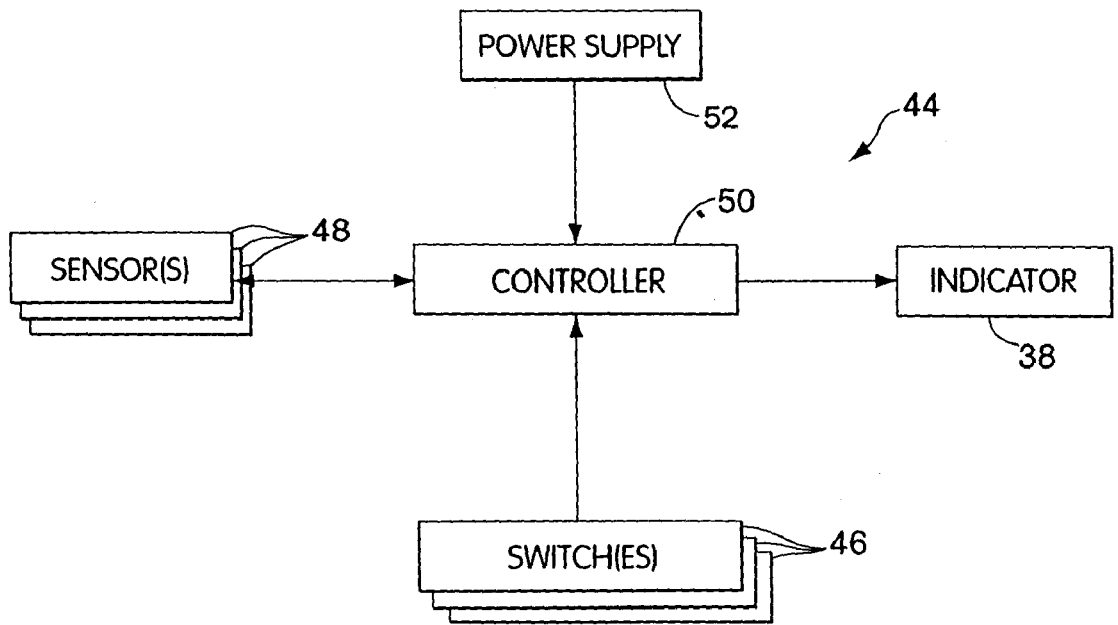
FIG. 3 is a diagrammatic representation of the device for indicating vehicle inclination.
Figure 4:
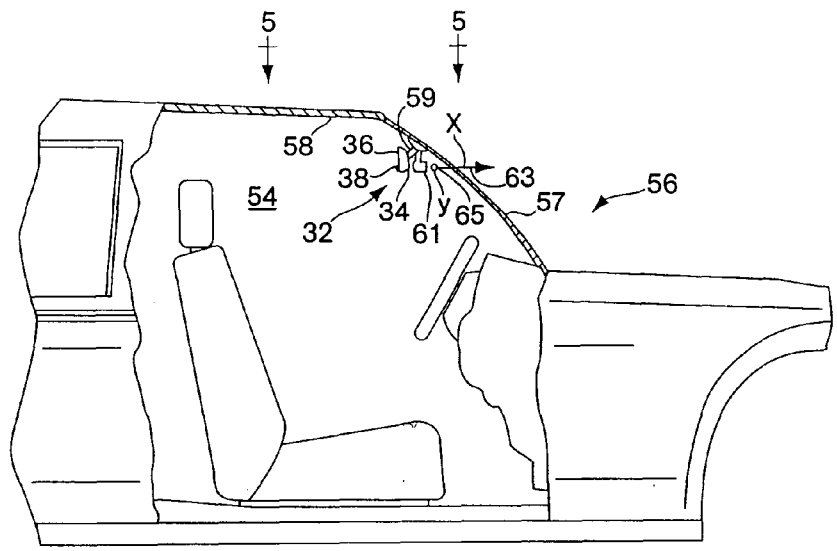
Figure 5:
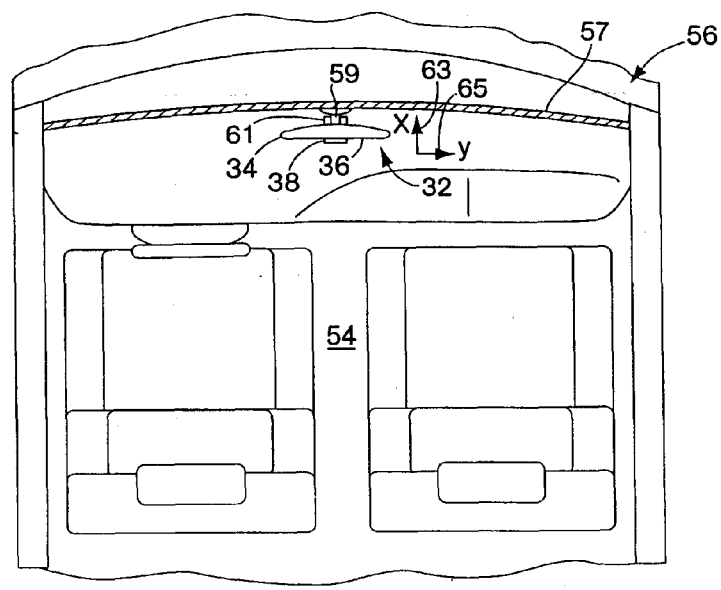
Figure 6:
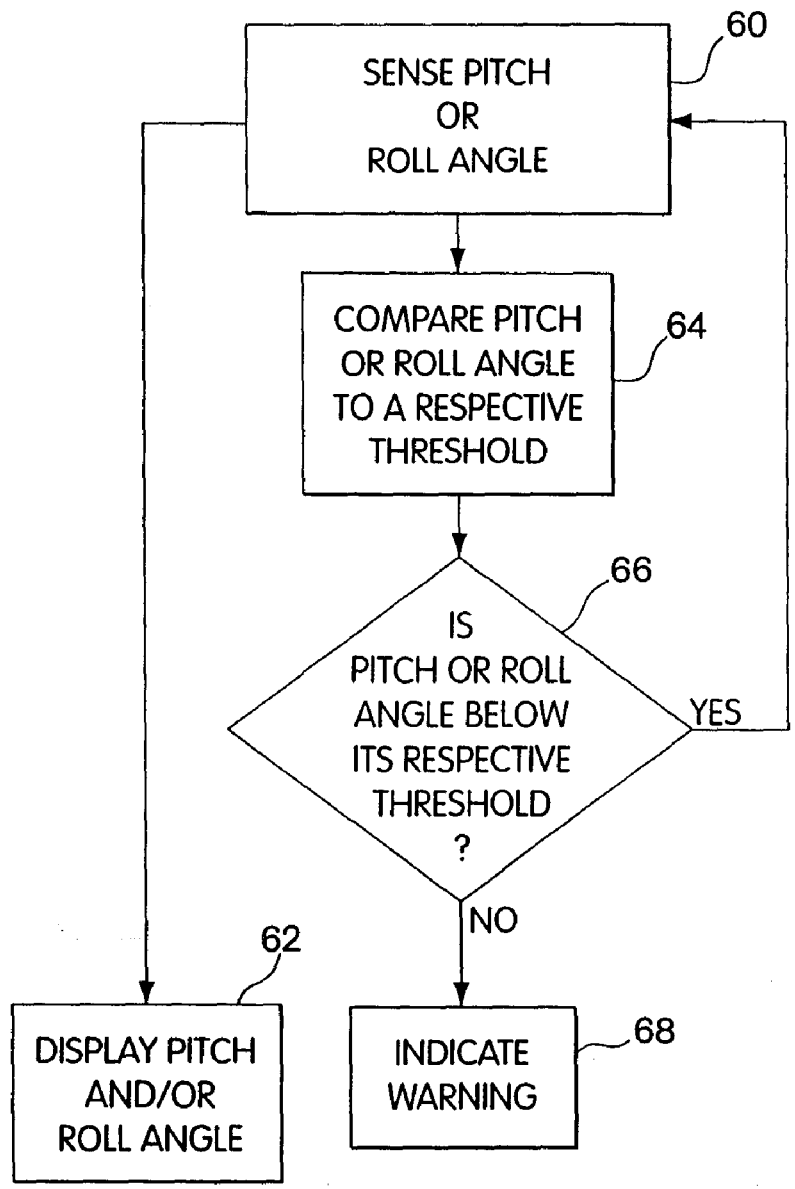
Figure 7:
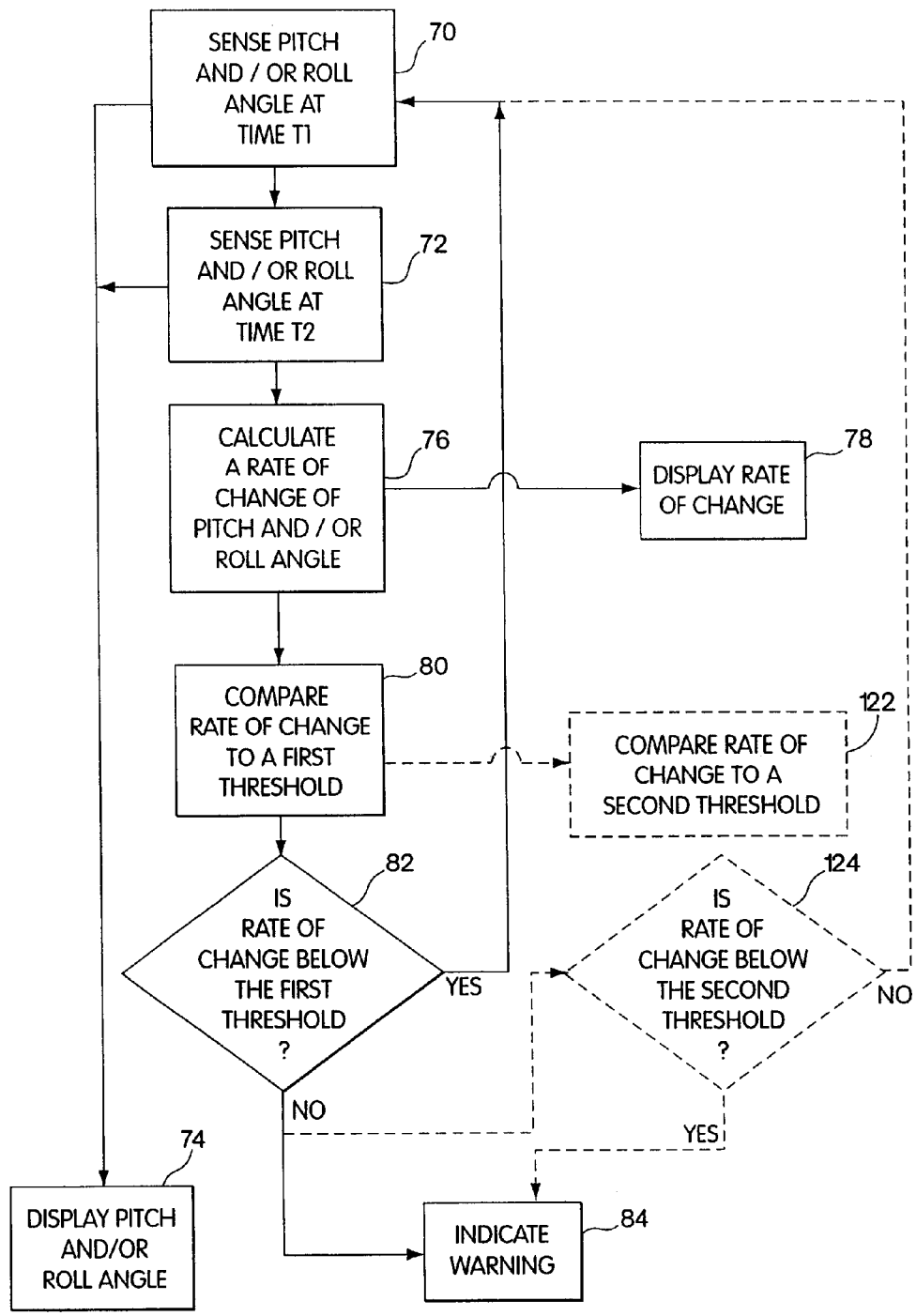

To detect the inclination of the vehicle, a suitable sensor (s) that is responsive to the pitch angle or roll angle of the vehicle may be employed. As shown in FIG. 3, a device 44 used to determine vehicle inclination, which may be embodied in the mirror assembly 32, includes the indicator 38, one or more switches 46 and one or more sensors 48 communicating directly or indirectly with the indicator 38. The one or more sensors 48 may communicate with each other and with the controller or with the controller independently of communicating with each other. The device 44 may also include a controller 50 and may also communicate with a power supply 52, as will be further described below. In this embodiment, sensor(s) 48 are incorporated into the mirror assembly 32. However, the present invention is not limited in this respect and other suitable locations for the sensor(s) may be employed. For example, the sensor(s) and/or controller may be mounted at a location apart from the indicator 38 and/or the mirror assembly 32.

Figure 4:
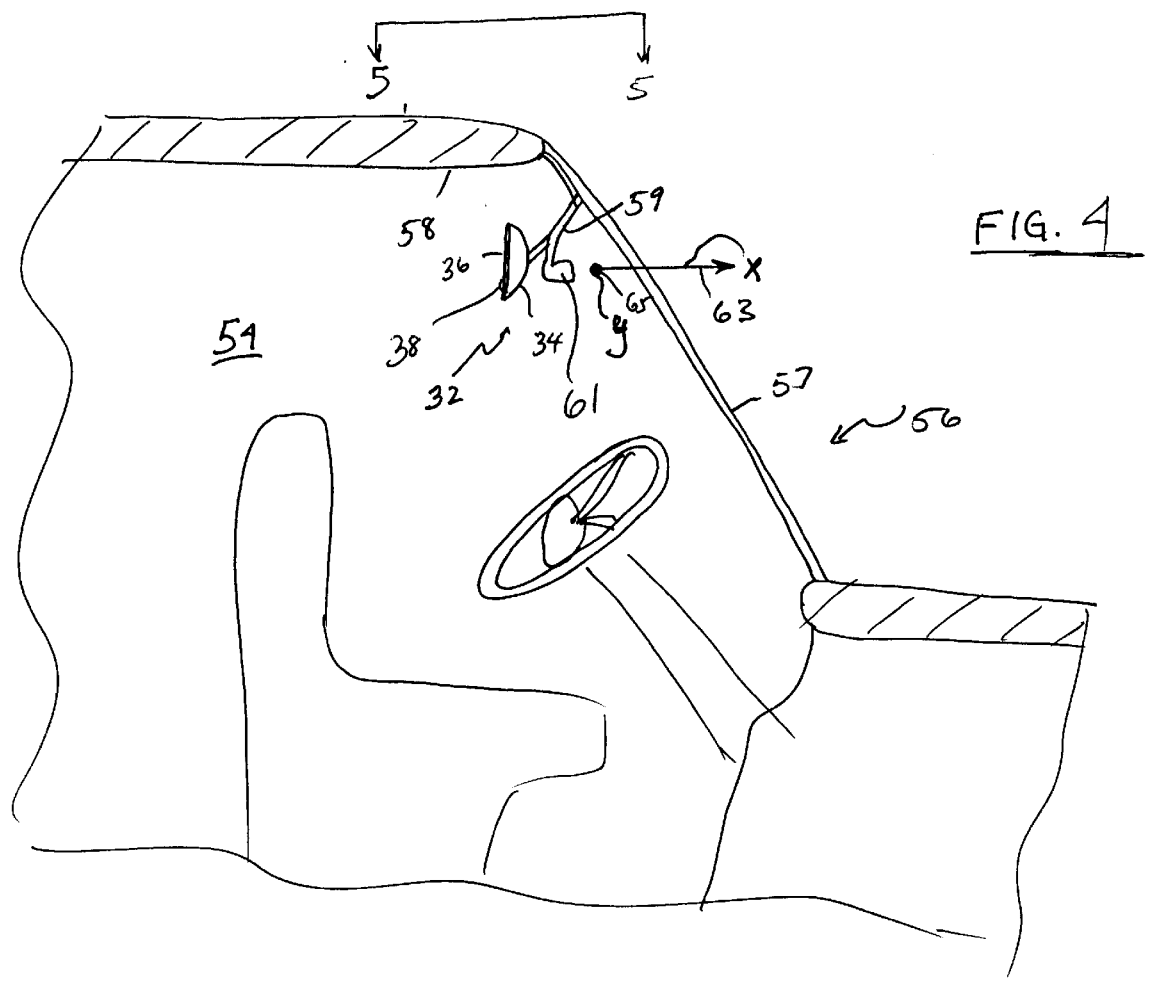
FIG. 4 is a diagrammatic representation of a mounting location of the mirror assembly of FIG. 2.
Figure 5:
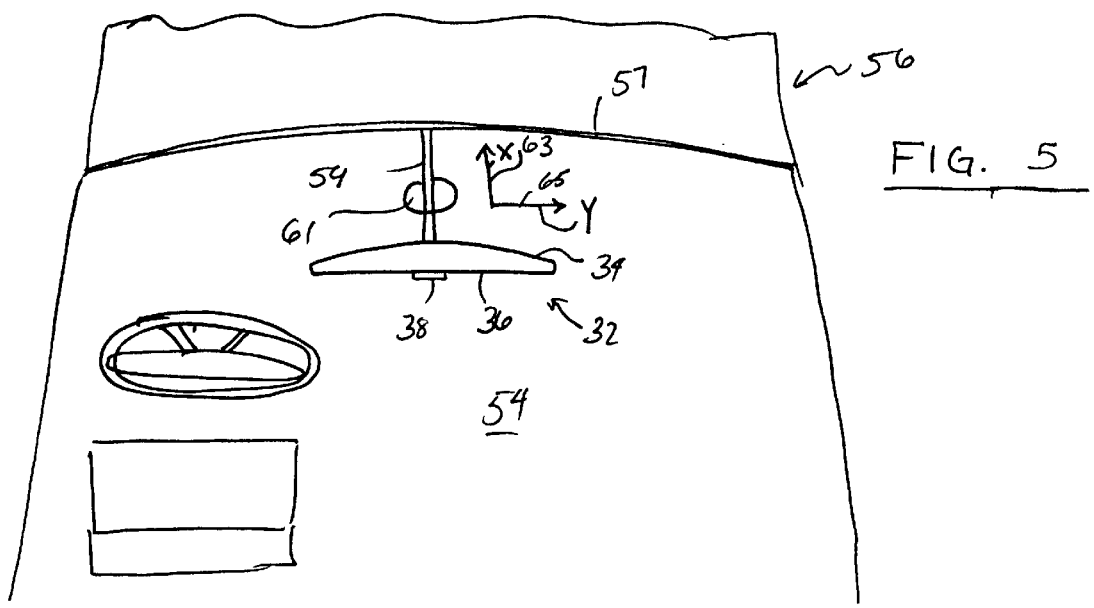
FIG. 5 is a view taken along line 5—5 of FIG. 4.

The mirror assembly 32 of FIG. 2 may be mounted in any vehicle, such as a sport utility vehicle, multi-passenger vehicle, sports car, sedan, or truck, to name a few, at any suitable location. When the mirror assembly is embodied as a rearview mirror (as opposed to a sideview mirror), the mirror assembly 32 is mounted at an overhead location in a passenger compartment 54 of a vehicle 56, as shown in FIGS. 4 and 5. In some vehicles, the mirror assembly 32 may be mounted to the windshield 57 or to the roof 58.

As is known, the rearview mirror is mounted to the windshield or roof so that the mirror may be positioned in a desired orientation. This may be accomplished using any suitable mechanism, such as a ball and socket joint. As described above, in one embodiment, the sensor(s) 48 is mounted in the mirror assembly 32. In this embodiment, the sensor(s) 48 is mounted to the fixed portion of the mirror assembly (i.e., fixed relative to the vehicle). Thus, as shown in FIG. 4, the mirror assembly 32 includes a mount 59 fixed relative to the vehicle 56, to positionably mount the frame 34. A pod 61, which is fixedly mounted to the mount 59, houses the sensor(s) 48.

Mounting the sensor(s) in a fixed position (i.e., stationary relative to the vehicle) reduces the necessity to recalibrate the device each time the mirror is repositioned. However, the present invention is not limited in this respect. Therefore, when the sensor(s) is mounted in the movable part of the mirror assembly, one or more switches may be used to recalibrate the device.

Although, in one embodiment, the indicator 38 is incorporated into the mirror assembly, the invention is not limited in this respect. Thus, the indicator 38 may be located in any suitable location, such as in an overhead console, in the vehicle dashboard or within the instrument display panel, to name a few. Further, the device itself may be incorporated into a stand-alone unit or it may be supplied in discrete components, each suitably mounted in the vehicle.

Continuing with reference to FIG. 3, the device 44 includes or otherwise communicates with the controller 50. The controller 50 may be part of the vehicle's controller or a stand-alone processor, as desired. The controller 50 includes a CPU (not shown), RAM (not shown) and a computer storage medium such as ROM (not shown). The ROM, which may be an electronically programmable chip, typically includes a computer readable code encoded therein. The controller may also include an input/output bus (not shown). The computer program allows the controller to perform the various desired functions. The device may also include a stand-alone power supply such as a battery, the vehicle power system, or solar power supply, as desired.

In one embodiment, the controller 50 communicates with the sensor(s) 48, manipulates the signal from the sensor(s) and signals the indicator to display desired information or otherwise alert the driver of changing conditions. Switch(es) 46 also communicates with the controller 50 to control the device in any desired manner.

In one embodiment, the controller 50 is a stand-alone processor mounted in the mirror assembly. For example, the controller 50 is mounted in the pod 61 (see FIGS. 4 and 5). The power supply 52 to the controller 50, sensor(s) 48 and indicator 38 is from the vehicle's power supply. Further the indicator 38 is an LED display. The sensor(s) 48 include sensor(s) to sense the pitch angle of the vehicle, the roll angle of the vehicle, the heading of the vehicle and/or the exterior and/or interior temperature.

As described above, the sensor(s) 48 used to sense the pitch angle and the roll angle of the vehicle may be any suitable sensor(s). One such sensor is a digital accelerometer. A first accelerometer may be used to sense the roll angle of the vehicle; whereas, a second accelerometer may be used to sense the pitch angle of the vehicle. Alternatively, in one embodiment, a combined sensor capable of detecting both pitch angle and roll angle may be employed. Such a sensor is available from Analog Devices of Norwood, Mass., U.S.A. under the product name ADXL202 or ADXL210 Dual Axis iMEMS Accelerometer with digital and/or analog output. Of course, those skilled in the art will recognize suitable alternative or additional sensors or accelerometers may be employed.

As shown in FIGS. 4 and 5, the vehicle 56 includes a longitudinal axis 63 that extends in the X direction and a lateral axis 65 that extends in the Y direction and that is perpendicular to the longitudinal axis. The accelerometers (or accelerometer if the abovementioned or similar dual axis accelerometer is used) are oriented in a manner to sense accelerations in the X direction (longitudinal acceleration) and in the Y direction (lateral acceleration). The accelerometers may be mounted in an orientation that is most sensitive to changes in inclination. Therefore, in one embodiment, the accelerometers may be oriented such that their sensitive axes are perpendicular to the force of gravity, such as in a plane that extends substantially parallel to the vehicle plane. The vehicle plane may be defined by the plane of the vehicle that is parallel to the horizontal road surface. For example, the vehicle plane may be defined by the plane that passes through the rotational axes of the wheels (not shown) of the vehicle.

When the pitch angle sensor (i.e., the X-axis accelerometer or the X-axis value of the dual axis accelerometer) is oriented so that its X axis is parallel to the vehicle plane as described above, and once the output signal from the accelerometer has been converted to an acceleration that varies between −1 g and +1 g, the output may be calculated using the following equation:

$$\text{Pitch angle} = a\sin(A_x/1\text{ g}), \qquad [1]$$

where $A_x$ is the acceleration sensed in the X direction of the vehicle.

When the roll angle sensor (i.e., the Y-axis accelerometer or the Y-axis value of the dual axis accelerometer) is oriented so that its Y axis is parallel to the vehicle plane as described above, and once the output signal from the accelerometer has been converted to an acceleration that varies between −1 g and +1 g, the output may be calculated using the following equation:

$$\text{Roll angle} = a\sin(A_y/1\text{ g}), \qquad [2]$$

where $A_y$ is the acceleration sensed in the Y direction of the vehicle.

In one embodiment, the X axis of the accelerometer used to sense longitudinal acceleration is aligned with the longitudinal axis of the vehicle and the Y axis of the accelerometer used to sense lateral acceleration is aligned with the lateral axis of the vehicle, with the X axis and the Y axis being orthogonal to each other. However, those skilled in the art will realize that these axes may be oriented in any desired orientation (i.e. direction and/or relative angular orientation) provided that the output signals of the accelerometers are appropriately corrected to the longitudinal and lateral axes of the vehicle and parallel to the vehicle plane.

Further, those skilled in the art will recognize that up to about 30°, the pitch angle may be assumed to be the output of the acceleration in the X direction, and the roll angle may be assumed to be the output of the acceleration in the Y direction. This is because sin α for small angles is approximately equal to α in radians.

Figure 6:
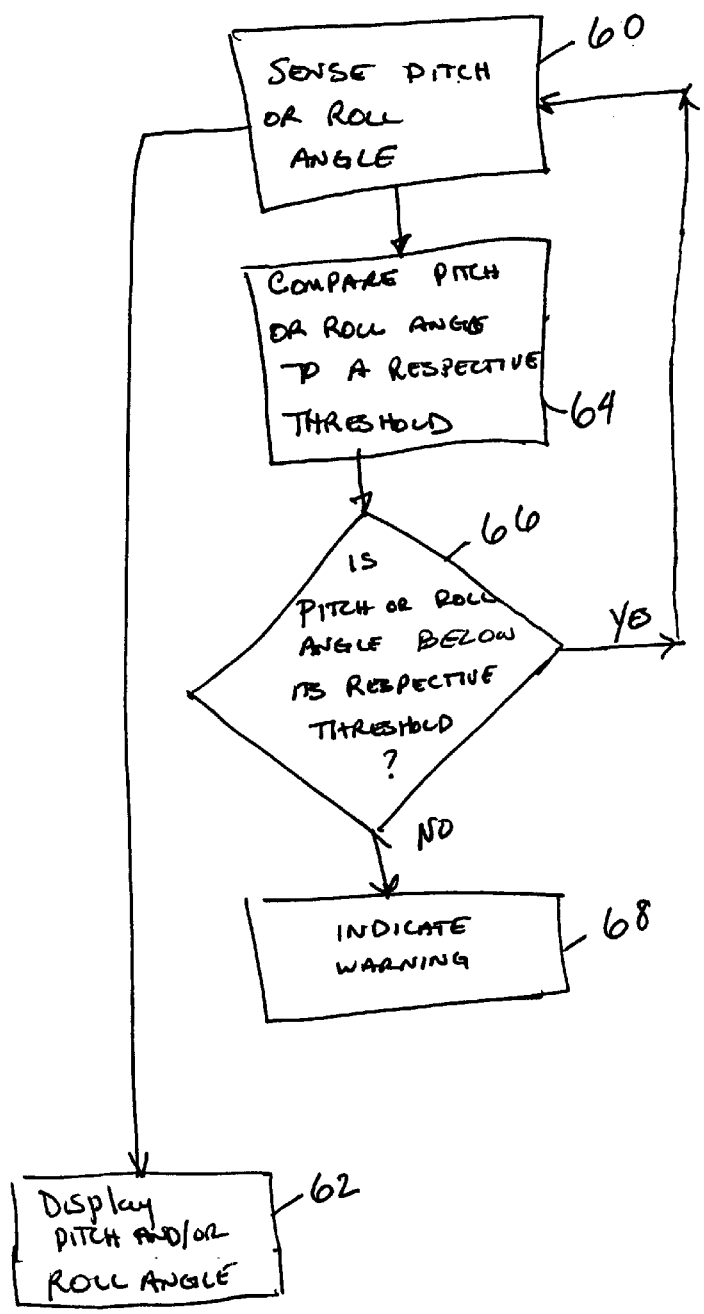
FIG. 6 is a flow chart according to one aspect of the invention.

With the pitch and roll angle known, the controller 50 may indicate various information to the driver. As shown in FIG. 6, at box 60, the pitch and/or roll angle is sensed. At box 62, the controller 50 may signal to the indicator 38 to display the pitch and/or roll angle of the vehicle. In one embodiment, it may be desirable to indicate a warning when the pitch and/or roll angle of the vehicle 56 exceeds a certain threshold. Thus, as shown at box 64, the sensed pitch and/or roll angle is compared to a respective one or more thresholds. At box 66, if the sensed pitch and/or roll angle is below the one or more thresholds, the controller 50 continues to monitor the pitch and/or roll angle by returning to box 60. If the sensed pitch and/or roll angle is above the one or more thresholds, a warning is indicated, as shown at box 68, which may be in the form of a visual or audible warning.

According to another aspect of the invention, the device 44 may be used to detect whether driver behavior, if continued, could cause a potential rollover condition. For example, if a driver were turning the vehicle too quickly or cornering at a high rate of speed, it may be desirable to warn the driver so that corrective action may be timely taken.

Figure 7:
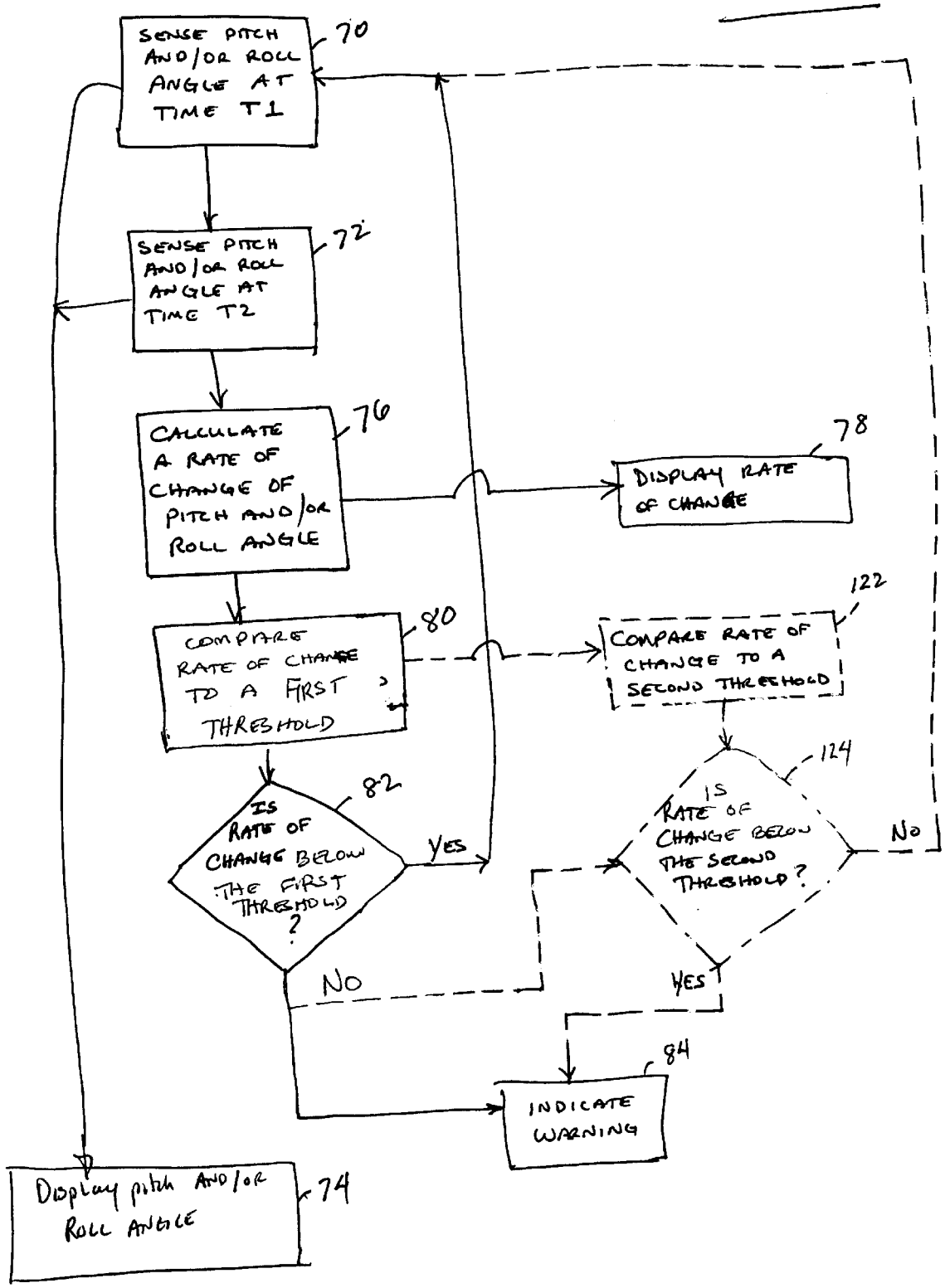
FIG. 7 is a flow chart of another aspect of the invention.

Thus, in one embodiment, the controller 50 calculates a rate of change of the sensed pitch and/or roll angle. With reference to FIG. 7, at box 70, the pitch and/or roll angle of the vehicle 56 at time T1 is sensed and stored in memory. At box 72, the pitch and/or roll angle of the vehicle 56 at time T2 is sensed, and may be stored in memory. Next, at box 76, the controller 50 calculates a rate of change of the pitch and/or roll angle and may display such information, as in box 74, as desired. The calculated rate of change may be displayed, as indicated at box 78. To determine whether or not the driving behavior represents a potential rollover condition, at box 80, the controller 50 compares the calculated rate of change to a first threshold. If, at box 82, the calculated rate of change is below the first threshold, the controller 50 continues to respond to sensed pitch and roll angle by returning to box 70. If the calculated rate of change of the pitch and/or roll angle is above the first threshold, the controller 50, at box 84, signals the indicator 38 to issue an appropriate warning. Although in one embodiment, the controller calculates a rate of change based on sensed values, the present invention is not limited in this respect as suitable sensors that sense rate of change may be employed.

If the indicator is incorporated into the mirror assembly 32 described above and defaults to displaying heading and/or temperature, then, in one embodiment, the indicator 38 automatically switches from such a default to indicating the pitch angle and roll angle data (whether it be absolute values or rate of change values) when the rate of change exceeds the first threshold.

Rather than utilizing the pitch angle and roll angle data individually, in some instances it may be desirable to use the sensed pitch angle and roll angle of the vehicle 56 as a combined value. For example, assume the vehicle is traversing a surface that is inclined downward and to the left, such that the driver is forced to turn the vehicle. In such a circumstance and for a given speed, the vehicle 56 may have a propensity to rollover, even though any one of the pitch or roll angles would individually not indicate a potential rollover condition.

Figure 8:
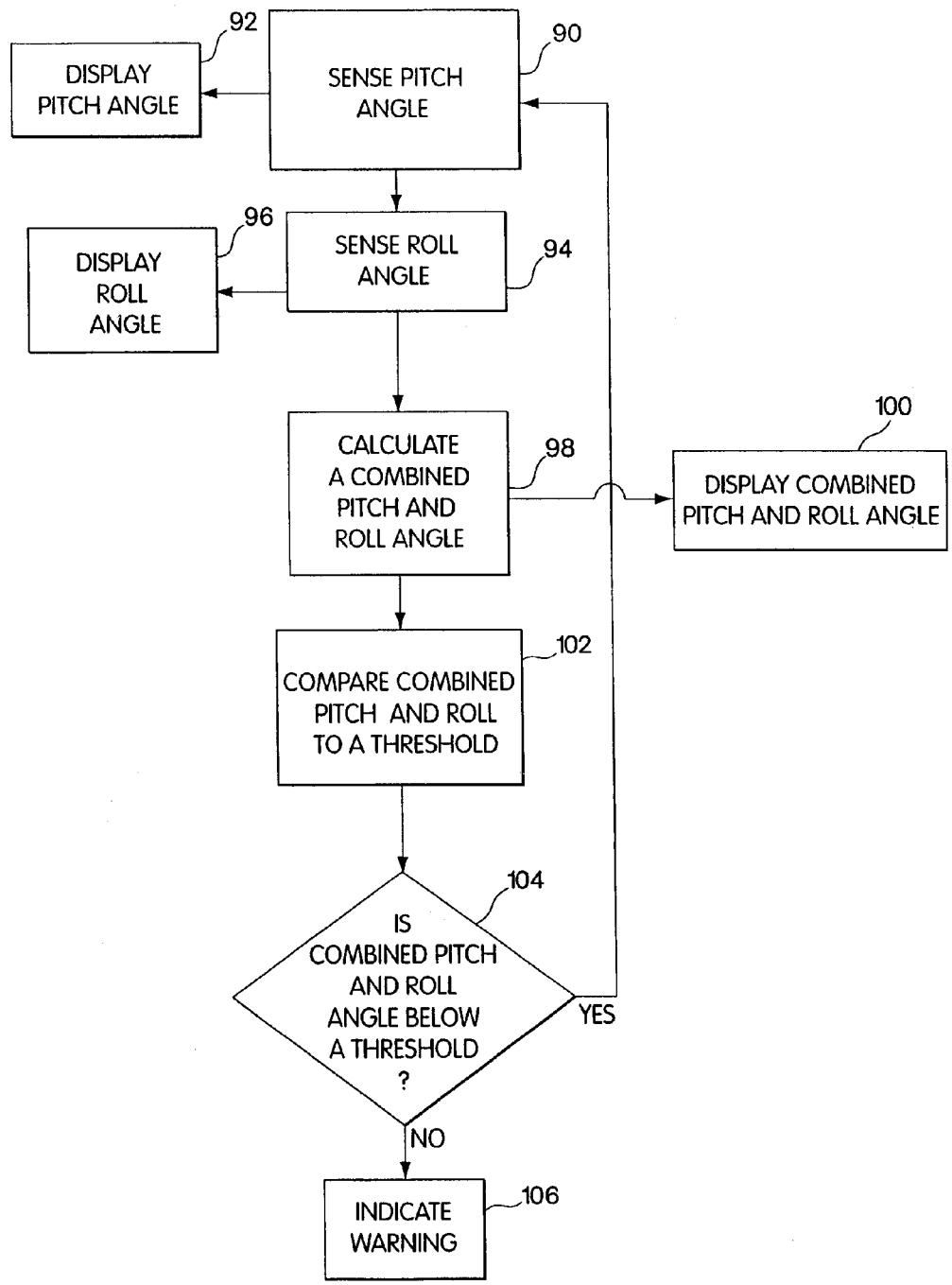
FIG. 8 is a flow chart of another aspect of the invention.
Figure 9:
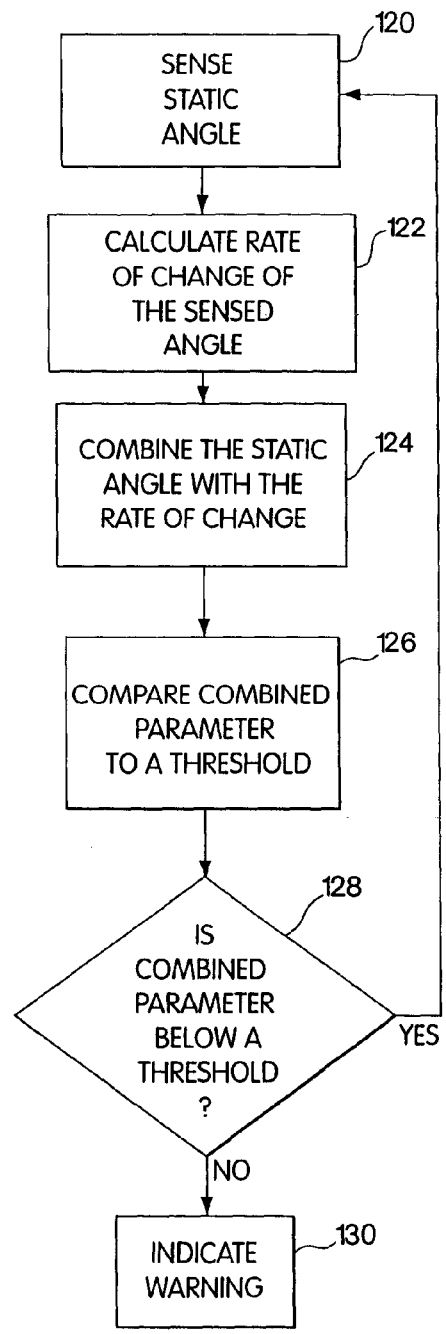

Such a feature is described with reference to FIG. 8. At box 90, the sensor(s) 48 senses the pitch angle and, if desired, displays the pitch angle at box 92. At box 94, the sensor(s) 48 senses the roll angle and, if desired, displays the roll angle at box 96. At box 98, the controller 50 calculates a combined pitch and roll angle. The combined pitch and roll angle may also be displayed as desired, at box 100. The controller 50 then compares the combined pitch and roll angle to a threshold, at box 102. At box 104, the controller 50 determines whether the combined pitch and roll angle is below a threshold. If it is, the controller 50 continues to receive the pitch and roll angle data from the sensor(s). If the combined pitch and roll angle is greater than the threshold, then, at box 106, a warning is indicated. Also, in one embodiment, the rate of change of the pitch angle and may be combined with the rate of change of the roll angle. This combined rate of change, like the combined pitch and roll angle, may be compared to yet another threshold. In a further embodiment, a combined value that represents the combined rate of change and the combined pitch and roll angle, may be compared to still another threshold.

In this embodiment, the threshold is set to a value that may be different than the value of any of the pitch or roll angle thresholds individually. Thus, as described above, if the combined pitch and roll angle exceeds such a threshold, a warning will be indicated. This is desirable because, the driving conditions may require an alarm to trigger at a point that is different, for example, earlier, than what would otherwise occur based on the individually sensed pitch and roll angle.

In any of the embodiments described above, the device may compensate for the speed of the vehicle. Thus, the threshold to which the pitch angle, the roll angle, the rate of change thereof or the combined pitch and roll angle is compared may be different, depending upon the speed of the vehicle. The controller 50 may receive data regarding the speed of the vehicle 56 using any desired method, including but not limited to, receiving data directly from the vehicle instrument panel via appropriate signal wires, using global positioning systems, integrating the sensed acceleration or using appropriate radar devices. It is to be appreciated, however, that the present invention is not limited in this respect as other methods may be used to receive speed data.

In some instances, road surface conditions are not always ideal and, thus, may have bumps or potholes. In such situations, a false alarm or a false warning of potentially adverse conditions may occur. Therefore, in one embodiment, the device 44 may compensate for such irregularities in the road surface. For example, a warning is triggered only when the rate of change of one of the pitch or roll angles is less than a threshold value. In this respect, should the vehicle encounter a pothole, it is likely that the vehicle will pitch momentarily such that the rate of change of the pitch angle would be very large. To reduce the potential for a false alarm, a warning is indicated only when the rate of change of the pitch or roll angle is below a certain threshold indicative of the large pitch angle but above a threshold which would indicate a potential rollover condition.

An example of this is shown with reference to FIG. 7. At box 122, the sensed rate of change is compared to a second threshold. If, at box 124, the rate is above the second threshold, then it is likely that the vehicle encountered a pothole, bump or other surface irregularity and no alarm would be indicated. If, at box 124, the rate is below the second threshold, but above the first threshold, then a warning is indicated as at box 84. Although the device may include a method to reduce false alarms, the present invention is not limited in this respect. Therefore, as shown in FIG. 7, the feature to reduce false alarms is shown in dashed lines.

According to another aspect of the invention, an alarm may be indicated when the static inclination of the vehicle (i.e., pitch, roll, or combined pitch and roll) combined with the rate of change of inclination exceeds a threshold. The propensity of a vehicle to roll over may depend on the combination of vehicle inclination (i.e., static roll angle and pitch angle or combined pitch and roll angle) and transient accelerations (i.e., rate of change of inclination). For example, if a vehicle is already rolled to a particular angle, such as when traversing a hill side, an additional transient acceleration resulting from a rapid maneuver or hitting a pot hole or bump either add or subtract from the roll over tendency. That is, if the vehicle is statically inclined in a particular direction, then a given rate of change of inclination in that direction will more likely cause a roll over condition than if the vehicle had been inclined in the opposite direction.

Figure 9:
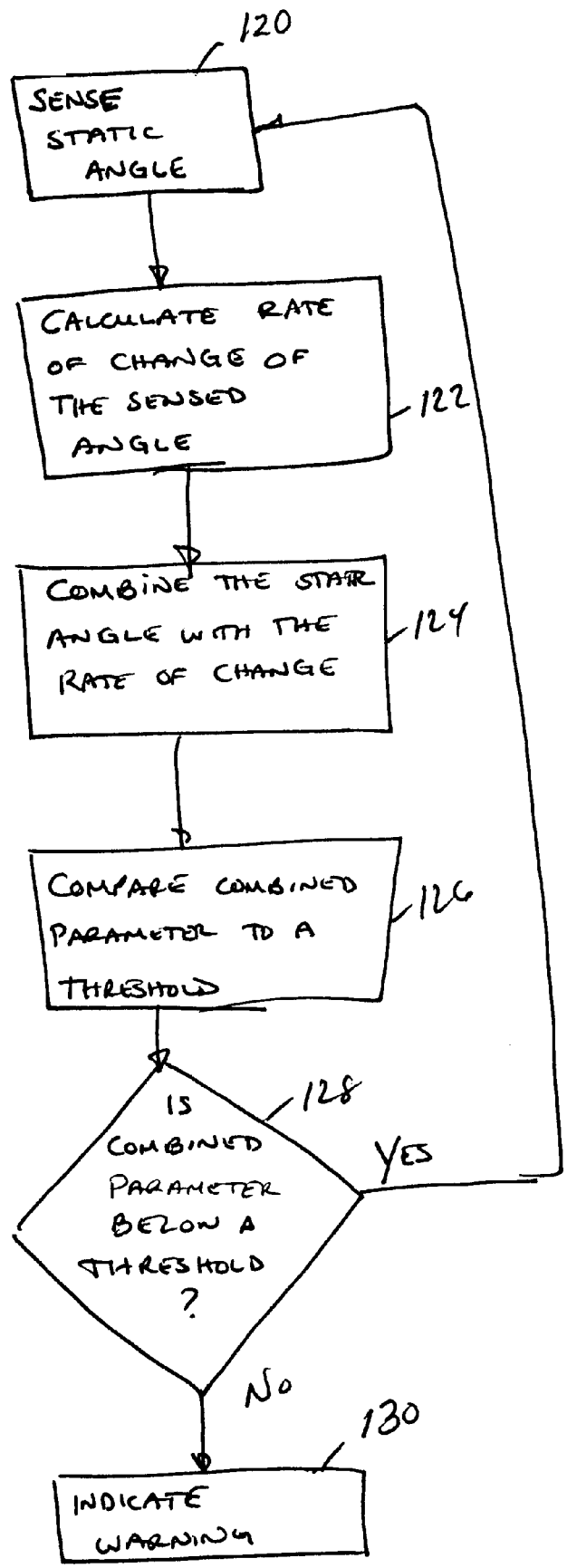
FIG. 9 is a flow chart of another aspect of the invention.
Figure 1:
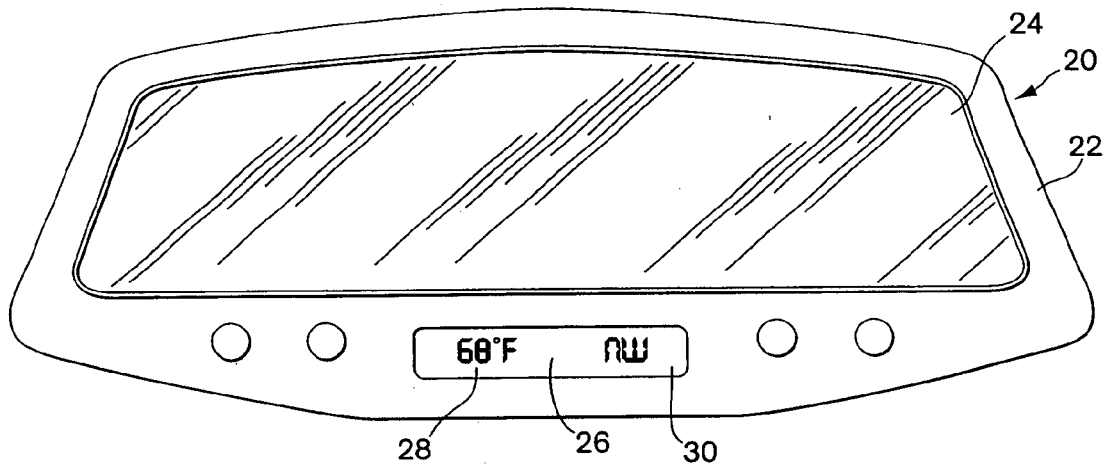
Figure 2:
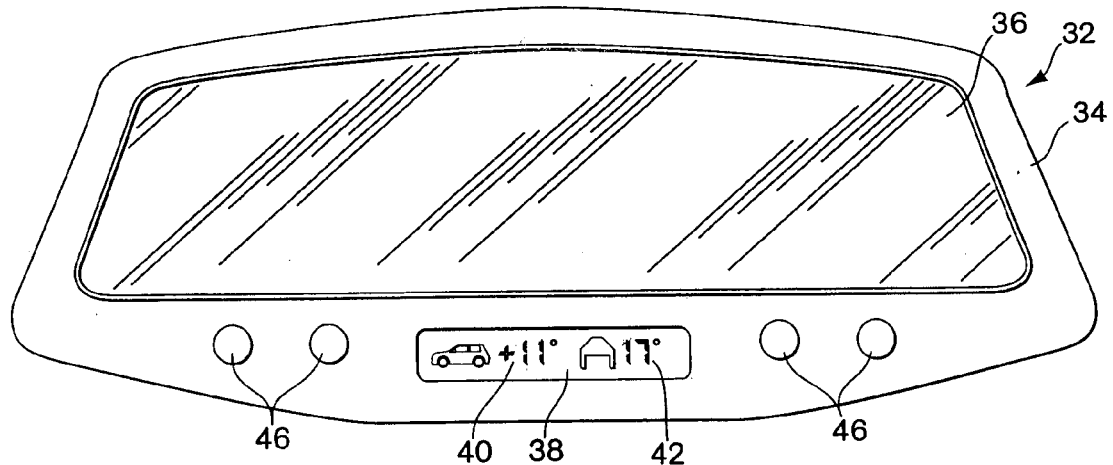

Thus, as shown in FIG. 9, at box 120, the pitch and/or roll angle of the vehicle is sensed to produce a static angle parameter. At box 122, the rate of change of the pitch angle and/or roll angle is calculated. At box 124, the static angle parameter and a parameter representing the rate of change of the pitch angle and/or roll angle is combined to produce a combined parameter. At box 126, the combined parameter is compared to a threshold. If, at box 128, the combined parameter is below the threshold, the static angle continues to be monitored at box 120. If, at box 128, the combined parameter is above the threshold, then, at box 130, a warning is indicated.

In one embodiment, this process may be carried out by the controller using the following equation:

$$\text{Combined Parameter} = K1*\Omega + K2*d\Omega/dT \qquad [3]$$

where:
Ω is a vector representing the long term average of the roll angle;
dΩ/dT is a vector representing the rate of change of vehicle roll angle; and
K1 and K2 are weighting factors dependant upon vehicle parameters.

It should be appreciated that although the above described equation is useful for the roll angle data, a similar equation may be employed for the pitch angle data, if desired.

Any of the thresholds described above may be a function of various vehicle parameters, such as, but not limited to, the moment of inertia of the vehicle and the center of gravity of the vehicle. The threshold(s) may alternatively be set using empirical data. These threshold(s) may be preloaded into the memory of the controller. In one embodiment, it may be desirable to calibrate the device according to specific vehicle parameters. This may be accomplished by activating various switches to enter a calibration mode for the specific vehicle on which the device is to be installed. The thresholds may also be a learned parameter.

In addition, according to another aspect, the data from the Y-axis accelerometer may be used to sense the lateral acceleration experienced by the vehicle, for example, when in a turn. Thus, in one embodiment, it may be desirable to set the threshold at a value that represents the driver's reaction threshold. For example, assume the vehicle is in a turn on a highway exit ramp. If the driver suddenly jerked the wheel so that the rate of change of the lateral acceleration exceeded a certain value, then a warning would alert the driver so that the driver could take corrective action.

According to another aspect of the invention, errors typically inherent in digital compasses may be corrected with the use of the one or more sensors 48, namely the accelerometers. Conventional automotive digital compasses are limited in their accuracy capabilities because of the lack of gimbaling. Since a magnetic compass is an instrument that can resolve the direction of the horizontal component of the total Earth's magnetic field vector, every compass either provides a horizontal reference or makes the assumption that the vehicle is level. In automotive applications, electronic compasses using magnetoresistive (MR) sensors or fluxgate sensors typically have not been gimbaled because of the extra costs associated with gimbals. Rather, they work on the assumption that the vehicle is essentially level. In New England, for example, the vertical to horizontal ratio (Hz/Hx) of the Earth's magnetic field is typically four to one, decreasing to zero at the equator and approaching 10 to 1 at high latitudes, such as in Alaska, for example. If a vehicle were to ascend a 20° hill in an easterly or westerly direction, the compass will show an±80° error. This phenomenon is often referred to as "gimbaling error" or "northerly turning error", because the compass will deflect to the north or south even though it is on an easterly or westerly heading. Correcting for gimbaling error in vehicles capable of driving off-road is particularly advantageous, because in such vehicles, the vehicle is rarely level and the driver may be dependent on the compass to determine a correct path for the vehicle.

The equation for gimbaling error when the vehicle is pitched on an angle is:

$$\text{Error}=\text{Sin }\phi*\text{Sin }\theta*Hz/Hx \qquad [4]$$

Where:
θ is the pitch angle of the vehicle;
φ is the heading of the vehicle;
Hz is the vertical component of the Earth's magnetic field; and
Hx is the horizontal component of Earth's magnetic field.

A similar formula applies for a vehicle rolled on an angle when the vehicle is in a northerly or southerly heading.

$$\text{Error}=\text{Cos }\phi*\text{Sin }\beta*Hz/Hx \qquad [5]$$

Where:
β is the roll angle of the vehicle;
φ is the heading of the vehicle;
Hz is the vertical component of the Earth's magnetic field; and
Hx is the horizontal component of Earth's magnetic field.

Equations [4] and [5] can be combined as follows:

$$\text{Total Error}=\text{Sin }\phi*\text{Sin }\theta*Hz/Hx+\text{Cos }\phi*\text{Sin }\beta*Hz/Hx \qquad [6]$$

By utilizing the pitch angle and roll angle outputs of the accelerometers filtered with a long time constant (and, in one embodiment, adding a Z axis to the magnetometer array), it is possible to remove these errors using the following equations:

$$H'x=Hx-K1*\text{Sin }\theta*Hz \qquad [7]$$

$$H'y=Hy-K2*\text{Sin }\beta*Hz \qquad [8]$$

Where:
Hx is the measured earth's magnetic field vector along the X axis (vehicle longitudinal axis);
Hy is the measured earth's magnetic field vector along the Y axis (vehicle lateral axis); and
Hz is the measured earth's magnetic field vector along the Z axis (vehicle up-down axis).

The corrected heading is given by:

$$\text{Heading}=a\,\tan(H'y/H'x) \qquad [9]$$

Where H'y and H'x are the corrected X and Y vectors

Those skilled in the art will recognize that if the magnetic latitude of a vehicle's location is known, an estimate of the vertical field can be made, reducing the need for a Z axis field sensor with reduction in cost and potentially some loss of accuracy.

Each of the elements described herein, or two or more together, may be modified or may also find utility in other applications different from those described above. In addition, although the specific embodiments disclosed in the figures and described in detail employ particular combinations, the present invention is not limited in this respect as various aspects of the invention can be employed together, separately or in different combinations. Thus, the particular embodiments described in detail are provided for illustrative purposes only. Those skilled in the art will recognize that various modifications and substitutions may be made without departing in any way from the spirit of the present invention as defined by the following claims.

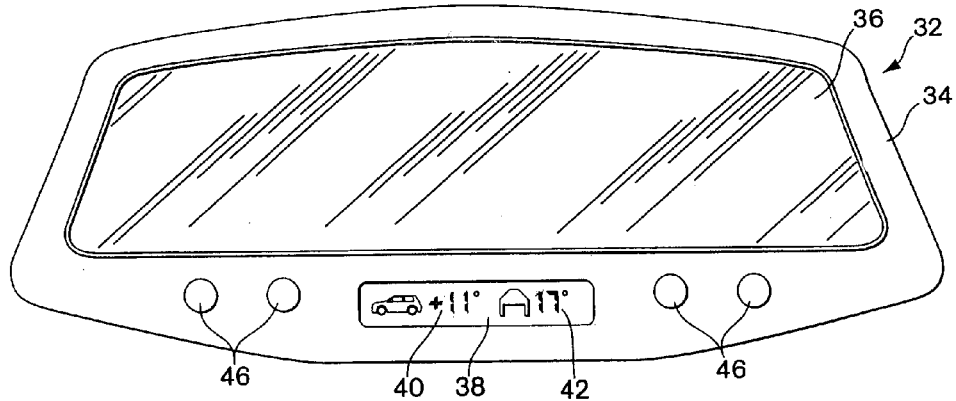

What is claimed is:

1. A mirror assembly for use in a vehicle, the mirror assembly comprising:
   a frame;
   a mirror mounted to the frame; and
   an indicator mounted to the frame, the indicator communicating directly or indirectly with a sensor that is responsive to at least one of pitch angle and roll angle of the vehicle, the indicator indicating the at least one of pitch angle and roll angle.

2. The assembly according to claim 1, wherein the indicator indicates a warning when the at least one of pitch angle and roll angle exceeds a threshold.

3. The assembly according to claim 1, wherein the indicator indicates a warning when a rate of change of the at least one of pitch angle and roll angle exceeds a threshold.

4. The assembly according to claim 2, wherein the warning is at least one of an audible and a visual warning.

5. The assembly according to claim 3, wherein the warning is at least one of an audible and a visual warning.

6. The assembly according to claim 1, wherein the indicator communicates with at least one of a compass to indicate a heading of the vehicle and a thermometer to indicate temperature.

7. The assembly according to claim 6, wherein the indicator automatically switches from indicating the at least one of the heading of the vehicle and the temperature to indicating the at least one of pitch angle and roll angle of the vehicle when the at least one of pitch angle and roll angle exceeds a threshold.

8. The assembly according to claim 6, wherein the indicator automatically switches from indicating the at least one of the heading of the vehicle and the temperature to indicating the at least one of pitch angle and roll angle of the vehicle when a rate of change of the at least one of pitch angle and roll angle exceeds a threshold.

9. The assembly according to claim 6, further comprising a manually operated switch that operates to switch the indicator between indicating the at least one of the heading of the vehicle and the temperature and indicating the at least one of pitch angle and roll angle of the vehicle.

10. The assembly according to claim 1, in combination with the sensor, wherein the mirror assembly further comprises a mount to mount the frame to the vehicle, the sensor being mounted to the mount.

11. The combination according to claim 10, wherein the mount, when attached to the vehicle, is stationary relative to the vehicle.

12. The assembly according to claim 1, in combination with the sensor, wherein the sensor, when the mirror assembly is mounted to the vehicle, is stationary relative to the vehicle.

13. The assembly according to claim 1, in combination with the sensor and the vehicle, the sensor being mounted within the vehicle and apart from the mirror assembly.

14. The assembly according to claim 1, in combination with the vehicle.

15. The combination according to claim 14, wherein the vehicle is a sport-utility vehicle.

16. The assembly according to claim 1, in combination with the sensor, wherein the sensor comprises an accelerometer.

17. The combination according to claim 16, wherein the accelerometer comprises a dual-axis accelerometer.

18. The combination according to claim 17, in combination with the vehicle, wherein the accelerometer is mounted in a plane extending substantially parallel to a vehicle plane, the vehicle plane defined by a plane through which rotational axes of wheels of the vehicle pass.

19. An apparatus for detecting inclination of a vehicle, the apparatus comprising:
   a controller;
   a sensor communicating with the controller, the sensor being responsive to at least one of pitch angle and roll angle of the vehicle, the controller calculating a rate of change of the at least one of pitch angle and roll angle based on the at least one of pitch angle and roll angle of the vehicle sensed by the sensor; and
   an indicator communicating with the controller, the indicator indicating the rate of change of the at least one of pitch angle and roll angle.

20. The apparatus according to claim 19, wherein the indicator indicates the at least one of pitch angle and roll angle.

21. The apparatus according to claim 19, wherein the indicator indicates a warning when a rate of change of the at least one of pitch angle and roll angle exceeds a threshold.

22. The apparatus according to claim 21, wherein the warning is at least one of an audible and a visual warning.

23. The apparatus according to claim 19, wherein the sensor comprises an accelerometer.

24. The apparatus according to claim 23, wherein the accelerometer comprises a dual-axis accelerometer.

25. The apparatus according to claim 24, in combination with the vehicle, wherein the accelerometer is mounted in a plane extending substantially parallel to a vehicle plane, the vehicle plane defined by a plane through which rotational axes of wheels of the vehicle pass.

26. The apparatus according to claim 19, in combination with the vehicle.

27. The combination according to claim 26, wherein the vehicle is a sport-utility vehicle.

28. The apparatus according to claim 20, further comprising at least one of a compass for detecting a heading of the vehicle and a thermometer for sensing temperature, the at least one of the compass and thermometer communicating with the controller.

29. The apparatus according to claim 28, wherein the controller causes the indicator to switch from indicating the at least one of the heading of the vehicle and the temperature to indicating the at least one of pitch angle and roll angle of the vehicle when the rate of change of the at least one of pitch angle and roll angle exceeds a threshold.

30. A method of detecting inclination of a vehicle, the method comprising:
   sensing at least one of pitch angle and roll angle of the vehicle;
   calculating a rate of change of the at least one of pitch angle and roll angle;
   comparing the rate of change to a threshold; and
   warning when the rate of change exceeds the threshold.

31. The method according to claim 30, further comprising indicating the sensed at least one of pitch angle and roll angle of the vehicle.

32. The method according to claim 30, further comprising indicating the rate of change of the at least one of pitch angle and roll angle of the vehicle.

33. The method according to claim 30, further comprising indicating at least one of a heading of the vehicle and the temperature.

34. The method according to claim 30, further comprising:
   indicating the sensed at least one of pitch angle and roll angle of the vehicle;
   indicating at least one of a heading of the vehicle and the temperature; and
   automatically switching from indicating the at least one of the heading of the vehicle and the temperature to indicating the at least one of pitch angle and roll angle of the vehicle when the at least one of pitch angle and roll angle exceeds a threshold.

35. The method according to claim 30, further comprising:
   indicating the sensed at least one of pitch angle and roll angle of the vehicle;

indicating at least, one of a heading of the vehicle and the temperature; and automatically switching from indicating the at least one of the heading of the vehicle and the temperature to indicating the at least one of pitch angle and roll angle of the vehicle when the rate of change of the at least one of pitch angle and roll angle exceeds a threshold.

36. A method of detecting inclination of a vehicle, the method comprising:

sensing at least one of a pitch angle and a roll angle of the vehicle;

comparing the at least one of sensed pitch angle and roll angle to at least one threshold; and comparing the at least one of sensed pitch angle and roll angle to a different threshold based upon vehicle operating conditions;

wherein sensing the at least one of pitch angle and roll angle comprises sensing a pitch angle and sensing a roll angle, the method further comprising:

comparing the sensed pitch angle to a first threshold;
comparing the sensed roll angle to a second threshold;
calculating a combined pitch and roll angle;
comparing the combined pitch and roll angle of the vehicle to a third threshold; and
indicating a warning when the combined pitch and roll angle exceeds the third threshold regardless of whether the sensed pitch angle exceeds the first threshold or whether sensed roll angle exceeds the second threshold.

37. The method according to claim 36, wherein comparing the sensed at least one of pitch angle and roll angle to a different threshold based upon vehicle operating conditions comprises comparing the at least one of sensed pitch angle and roll angle to a different threshold based upon the conditions of the surface being traversed by the vehicle.

38. The method according to claim 36, wherein comparing the at least one of sensed pitch angle and roll angle to a different threshold based upon vehicle operating conditions comprises comparing the at least one of sensed pitch angle and roll angle to a different threshold based upon the speed of the vehicle.

39. A method of reducing false alarms in a device for detecting inclination of a vehicle, the method comprising:

sensing at least one of pitch angle and roll angle of the vehicle;

calculating a rate of change of the at least one pitch angle and roll angle of the vehicle;

warning only if the rate of change of the at least one of pitch angle and roll angle of the vehicle exceeds a first threshold value and does not exceed a second threshold value.

40. The method according to claim 39, wherein the second threshold is greater than the first threshold.

41. In a vehicle having a vehicle plane defined by the plane through which the rotational axes of the wheels of the vehicle pass, a device comprising:

a sensor for sensing lateral acceleration of the vehicle in the vehicle plane;

a controller communicating with the sensor, the controller calculating a rate of change of the lateral acceleration and comparing the calculated rate of change to a threshold; and an indicator communicating directly or indirectly with the controller, the indicator indicating a warning when the calculated rate of change exceeds the threshold.

42. The device according to claim 41, in combination with the vehicle.

43. The device according to claim 41, wherein the sensor comprises a digital accelerometer.

44. The device according to claim 43, wherein the accelerometer is a dual axis accelerometer.

45. The device according to claim 41, wherein the sensor senses a roll angle of the vehicle and wherein the indicator indicates the roll angle.

46. The device according to claim 43, wherein the accelerometer senses a pitch angle and a roll angle of the vehicle and wherein the indicator indicates the pitch angle and the roll angle.

47. The device according to claim 41, wherein the threshold is representative of a driver reaction threshold.

48. A multiple use mirror assembly for use in a motor vehicle, the mirror assembly comprising:

a mirror frame having a mirror fixed thereto and means for adjustably securing the mirror frame to the motor vehicle;

an indicator integrally secured to the mirror assembly and simultaneously visible with reflections in the mirror; and at least one sensor for sensing at least one of pitch angle and roll angle of the motor vehicle independent of the relative position of the mirror frame and the mirror relative to the vehicle and operatively connected to the indicator, the indicator indicating at least one of the sensed pitch angle and roll angle of the vehicle.

49. The mirror assembly according to claim 48, further comprising a controller communicating with the indicator and the at least one sensor, the controller calculating a rate of change of the at least one of pitch angle and roll angle, wherein the indicator includes means for indicating a warning when the rate of change exceeds a first threshold.

50. The mirror assembly according to claim 49, wherein the indicator includes means for indicating a warning when the rate of change is above the first threshold and below a second threshold, wherein the first threshold is defined by a recoverable rate of change and the second threshold is defined by a non-recoverable one of pitch angle and roll angle of the vehicle.

51. A mirror assembly for use in a vehicle, the mirror assembly comprising:

a frame;

a mirror mounted to the frame; and a compass coupled to the frame, the compass detecting a heading of the vehicle, the compass communicating with a controller that communicates with a sensor that is responsive to at least one of pitch angle and roll angle of the vehicle, the controller correcting the detected heading of the vehicle based on the sensed at least one of pitch angle and roll angle of the vehicle; and an indicator mounted to the frame, the indicator indicating the corrected heading.

52. The assembly according to claim 51, wherein the indicator indicates a warning when the at least one of pitch angle and roll angle exceeds a threshold.

53. The assembly according to claim 51, wherein the indicator indicates a warning when a rate of change of the at least one of pitch angle and roll angle exceeds a threshold.

54. The assembly according to claim 52, wherein the warning is at least one of an audible and a visual warning.

55. The assembly according to claim 53, wherein the warning is at least one of an audible and a visual warning.

56. The assembly according to claim 51, wherein the indicator communicates with a thermometer to indicate temperature.

57. The assembly according to claim 51, in combination with the sensor, wherein the mirror assembly further comprises a mount to mount the frame to the vehicle, the sensor being mounted to the mount.

58. The combination according to claim 57, wherein the mount, when attached to the vehicle, is stationary relative to the vehicle.

59. The assembly according to claim 51, in combination with the sensor, wherein the sensor, when the mirror assembly is mounted to the vehicle, is stationary relative to the vehicle.

60. The assembly according to claim 51, in combination with the sensor and the vehicle, the sensor being mounted within the vehicle and apart from the mirror assembly.

61. The assembly according to claim 51, in combination with the vehicle.

62. The assembly according to claim 51, in combination with the sensor, wherein the sensor comprises an accelerometer.

63. The combination according to claim 62, wherein the accelerometer comprises a dual-axis accelerometer.

64. The apparatus according to claim 51, wherein the indicator indicates the at least one of pitch angle and roll angle.

\* \* \* \* \*

UNITED STATES PATENT AND TRADEMARK OFFICE
CERTIFICATE OF CORRECTION

PATENT NO. : 6,456,194 B1
DATED : September 24, 2002
INVENTOR(S) : Craig D. Carlson et al.

It is certified that error appears in the above-identified patent and that said Letters Patent is hereby corrected as shown below:

The title page, showing an Illustrative figure, should be deleted and substitute therefore the attached title page.

Delete drawing sheet(s) 1-7, and substitute therefore the drawing sheet(s) consisting of Fig(s) 1-9 as shown on the attached pages.

Signed and Sealed this

Twenty-ninth Day of April, 2003

JAMES E. ROGAN
*Director of the United States Patent and Trademark Office*

(12) United States Patent
Carlson et al.

(10) Patent No.: US 6,456,194 B1
(45) Date of Patent: Sep. 24, 2002

(54) DEVICE AND METHOD FOR SENSING AND INDICATING INCLINATION OF AN AUTOMOTIVE VEHICLE

(75) Inventors: Craig D. Carlson, 770 Boylston St., Boston, MA (US) 02199; Michael A. Reed, Danvers, MA (US); J. Thomas Fowler, Marblehead, MA (US)

(73) Assignee: Craig D. Carlson, Framingham, MA (US)

(*) Notice: Subject to any disclaimer, the term of this patent is extended or adjusted under 35 U.S.C. 154(b) by 0 days.

(21) Appl. No.: 09/666,191

(22) Filed: Sep. 21, 2000

(51) Int. Cl.[7] ............................................. B60Q 1/00

(52) U.S. Cl. ................................. 340/440; 340/691.6

(58) Field of Search .................... 340/440, 439, 340/438, 691.6, 691.5, 691.4, 815.4

(56) References Cited

U.S. PATENT DOCUMENTS

| | | | |
|---|---|---|---|
| 3,863,067 A | | 1/1975 | Gooley .................... 33/366.16 |
| 3,921,128 A | * | 11/1975 | Snead ........................ 340/440 |
| 4,503,622 A | | 3/1985 | Swartz et al. ............. 33/366.14 |
| 4,606,133 A | | 8/1986 | Mills ........................ 33/366.14 |
| 4,630,904 A | * | 12/1986 | Pastore ........................ 359/636 |
| 4,725,843 A | * | 2/1988 | Suzuki et al. ................ 342/359 |
| 4,853,675 A | | 8/1989 | Foster |
| 4,882,565 A | * | 11/1989 | Gallmeyer ................... 340/461 |
| 4,908,767 A | | 3/1990 | Scholl et al. |
| 4,912,662 A | | 3/1990 | Butler et al. ................. 702/154 |
| 4,926,690 A | | 5/1990 | Oberg ..................... 73/514.37 |
| 4,942,668 A | | 7/1990 | Franklin ................... 33/366.14 |
| 5,066,112 A | | 11/1991 | Lynam et al. ............... 359/267 |
| 5,073,012 A | | 12/1991 | Lynam ........................ 359/265 |
| 5,207,492 A | * | 5/1993 | Roberts ........................ 362/30 |
| 5,223,814 A | * | 6/1993 | Suman .................... 340/461 X |
| 5,255,442 A | | 10/1993 | Schierbeek et al. ........... 33/361 |
| 5,285,060 A | * | 2/1994 | Larson et al. ........... 340/461 X |
| 5,371,951 A | | 12/1994 | Piske ...................... 33/366.12 |
| 5,406,858 A | * | 4/1995 | Brainard ..................... 74/5.34 |

(List continued on next page.)

FOREIGN PATENT DOCUMENTS

| | | |
|---|---|---|
| EP | 0 965 502 | 12/1999 |
| FR | 2 783 778 | 3/2000 |
| JP | 240399 | * 9/1997 |

OTHER PUBLICATIONS

Analog Devices, Analog Devices' Micromachined Accelerometers to be Used in Ford Vehicles, Copyright 1995–1999 Analog Devices, Inc., Apr. 21, 1999, http://www.content.analog.com/pressrelease/prdisplay/0,1622,35,00.html, pp. 1–2.

Analog Devices, Analog Devices Accelerometer Named EDN "Innovation of the Year", Copyright 1995–1999 May 3, 1999, http://www.content.analog.com/pressrelease/prdisplay/0,1622,43,00.html, pp. 1–2.

Analog Devices, ADXL202, Copyright 1995–1999, pp. 1–3, http://www.analog.com/industry/iMEMS/products/ADXL202.html, Jul. 23, 1999.

Analog Devices, Previous Accelerometers eNewsletter, Copyright 1995–1999, Jul. 23, 1999, p. 1. http://www.analog.com/industry/iMEMS/prevenews.html.

(List continued on next page.)

*Primary Examiner*—Thomas Mullen
(74) *Attorney, Agent, or Firm*—Wolf, Greenfield & Sacks, P.C.

(57) ABSTRACT

A device and method used to indicate vehicle inclination and conditions indicative of a potential rollover is disclosed. The device and method may be embodied in original equipment or in an aftermarket product in a manner so that the driver may easily determine the vehicle inclination. For example, the device and method may be embodied in a mirror assembly mounted in the vehicle. The device and method may also be used to detect the rate of change of inclination to provide a warning of adverse driving conditions. The device and method may also include a compass that indicates a corrected heading of the vehicle.

64 Claims, 7 Drawing Sheets